US011797426B2

(12) United States Patent
Clement et al.

(10) Patent No.: US 11,797,426 B2
(45) Date of Patent: Oct. 24, 2023

(54) AUTOMATING TEST-DRIVEN DEVELOPMENT WITH TRANSFORMERS

(71) Applicant: MICROSOFT TECHNOLOGY LICENSING, LLC., Redmond, WA (US)

(72) Inventors: Colin Bruce Clement, Seattle, WA (US); Shao Kun Deng, Bellevue, WA (US); Neelakantan Sundaresan, Bellevue, WA (US); Alexey Svyatkovskiy, Bellevue, WA (US); Michele Tufano, Bellevue, WA (US)

(73) Assignee: MICROSOFT TECHNOLOGY LICENSING, Redmond, CA (US)

( * ) Notice: Subject to any disclaimer, the term of this patent is extended or adjusted under 35 U.S.C. 154(b) by 0 days.

(21) Appl. No.: 17/508,097

(22) Filed: Oct. 22, 2021

(65) Prior Publication Data

US 2023/0128008 A1 Apr. 27, 2023

(51) Int. Cl.

| | |
|---|---|
| ***G06F 8/30*** | (2018.01) |
| ***G06F 11/36*** | (2006.01) |
| ***G06F 8/41*** | (2018.01) |
| ***G06F 8/77*** | (2018.01) |
| ***G06N 3/04*** | (2023.01) |
| ***G06N 3/088*** | (2023.01) |

(52) U.S. Cl.

CPC ............ *G06F 11/3684* (2013.01); *G06F 8/41* (2013.01); *G06F 8/77* (2013.01); *G06N 3/04* (2013.01); *G06N 3/088* (2013.01)

(58) Field of Classification Search

CPC ..... G06F 8/30; G06F 8/35; G06F 8/41; G06F 8/77; G06F 11/3684; G06F 11/3688; G06F 11/3696; G06N 3/088

See application file for complete search history.

(56) References Cited

U.S. PATENT DOCUMENTS

| | | | | |
|---|---|---|---|---|
| 8,028,276 | B1 | 9/2011 | Bessonov | |
| 9,632,754 | B2 | 4/2017 | Gyure et al. | |
| 2011/0167409 | A1 | 7/2011 | Schadow | |
| 2012/0226465 | A1 * | 9/2012 | Mizuno | G06F 11/3684 702/123 |

(Continued)

FOREIGN PATENT DOCUMENTS

WO 2018007822 A1 1/2018

OTHER PUBLICATIONS

Michele Tufano et al., "Unit Test Case Generation with Transformers and Focal Context," Sep. 11, 2020, retrieved online on Mar. 7, 2023, pp. 1-15. Retrieved from the Internet: <URL: https://arxiv.org/pdf/2009.05617.pdf>. (Year: 2020).*

(Continued)

*Primary Examiner* — Hanh Thi-Minh Bui

(57) ABSTRACT

A test-driven development system utilizes a neural transformer model with attention to generate method bodies for a focal method given its associated test cases, and optionally a method signature and a docstring of the focal method. The candidate method bodies are validated for syntactic correctness, tested using the given test cases, and tested with a donor class in a target system. Those candidate method bodies passing the validation and testing are then ranked based on a PLUM score that analyzes the candidate method bodies against various quality and performance metrics.

10 Claims, 7 Drawing Sheets

100

TRAINING PHASE 102

NATURAL LANGUAGE TEXT 108

PRE-TRAINING ENGINE 106

PRE-TRAINED NEURAL TRANSFORMER MODEL 110

SOURCE CODE SAMPLES 112

PRE-TRAINING ENGINE 106

PRE-TRAINED NEURAL TRANSFORMER MODEL 114

FINE-TUNING DATASET 116

FINE-TUNING ENGINE 120

NEURAL TRANSFORMER MODEL 118

INFERENCE PHASE 104

INFERENCE ENGINE 127

TEST CASES 122

METHOD SIGNATURE 124

METHOD DOCSTRING 126

NEURAL TRANSORMER MODEL 118

BEAM SEARCH COMPONENT 125

CANDIDATE METHOD BODIES 128

TEST AND VALIDATION ENGINE 130

VALIDATED METHOD BODIES 132

RANKING ENGINE 134

RANKED METHOD BODIES 136

(56) References Cited

U.S. PATENT DOCUMENTS

2021/0132913 A1* 5/2021 Singh ........................ G06F 8/33

OTHER PUBLICATIONS

Mohammad Ghafari et al., "Automatically Identifying Focal Methods under Test in Unit Test Cases," IEEE, 2015, retrieved online on Mar. 7, 2023, pp. 1-10. Retrieved from the Internet: <URL: https://ieeexplore.ieee.org/stamp/stamp.jsp?tp=&arnumber=7335402>. (Year: 2015).*

Anand, et al., "On Adversarial Robustness of Synthetic Code Generation", In Repository of arXiv:2106.11629v1, Jun. 22, 2021, 16 Pages.

Austin, et al., "Program Synthesis with Large Language Models", In Repository of arXiv:2108.07732v1, Aug. 16, 2021, 34 Pages.

"International Search Report and Written Opinion Issued in PCT Application No. PCT/US22/041133", dated Dec. 15, 2022, 12 Pages.

"How to Automate Test-Driven Development (TDD)", Retrieved from: https://www.parasoft.com/blog/how-to-automate-test-driven-development-tdd/, Jan. 20, 2011, 4 Pages.

Clement, et al., "PYMT5: Multi-Mode Translation of Natural Language and PYTHON Code with Transformers", In Repository of arXiv:2010.03150v1, Oct. 7, 2020, 14 Pages.

Lewis, et al., "BART: Denoising Sequence-to-Sequence Pre-training for Natural Language Generation, Translation, and Comprehension", In Repository of arXiv:1910.13461v1, Oct. 29, 2019, 10 Pages.

Svyatkovskiy, et al., "IntelliCode Compose: Code Generation Using Transformer", In Repository of arXiv:2005.08025v2, Oct. 29, 2020, 11 Pages.

Tufano, et al., "Unit Test Case Generation with Transformers and Focal Context", In Repository of arXiv:2009.05617v2, May 20, 2021, 15 Pages.

Vaswani, et al., "Attention Is All You Need", In Repository of arXiv:1706.03762v5, Dec. 6, 2017, pp. 1-15.

Yin, et al., "A Syntactic Neural Model for General-Purpose Code Generation", In Repository of arXiv:1704.01696v1, Apr. 6, 2017, 14 Pages.

"Configuration—Configuring Your Game", Retrieved from https://www.codingame.com/playgrounds/25775/codingame-sdk-documentation/configuration, Retrieved date Apr. 14, 2023, 7 Pages.

"Stub Generator", Retrieved from https://www.codingame.com/playgrounds/40701/help-center/stub-generator, Retrieved date Apr. 14, 2023, 4 Pages.

* cited by examiner

AUTOMATING TEST-DRIVEN DEVELOPMENT WITH TRANSFORMERS

BACKGROUND

Test-driven development is a software development process in which the requirements for the behavior and functionality of a program are defined first and implemented in test cases prior to the development of the corresponding source code. The test cases specify and validate the behavior and functionality of the program. As the source code is developed, it is repeatedly tested against the test cases to ensure that the developed source code meets the requirements.

The test-driven development process produces a better program design and quality of the source code. The software design becomes modular since a developer focuses on a single function at a time and does not move to the next one until the function passes all tests. This results in the code being modular making it more manageable and easily extensible. In addition, the test-driven development process reduces the number of hours spent on debugging and maintenance.

Although test-driven development has several benefits, the process consumes a significant amount of time. In some situations, test-driven development slows down development since the implemented source code may not be readily available until the test cases are developed and the source code passes all the pre-defined test cases. In these situations, test-driven development is abandoned with developers directly implementing the source code without the test cases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The automation of the generation of a method body is performed by a neural transformer model with attention given test cases for the method body, and optionally a method signature and a docstring of the focal method. The test cases specify the behavior and functionality of the program. The generated method bodies are validated for syntactic correctness, tested using the given test cases, and tested with a donor class in a target system. Those candidate method bodies passing the validation and testing are then ranked based on a Programming Language Understanding Metric (PLUM) score that judges the automatically generated methods against various quality and performance metrics.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
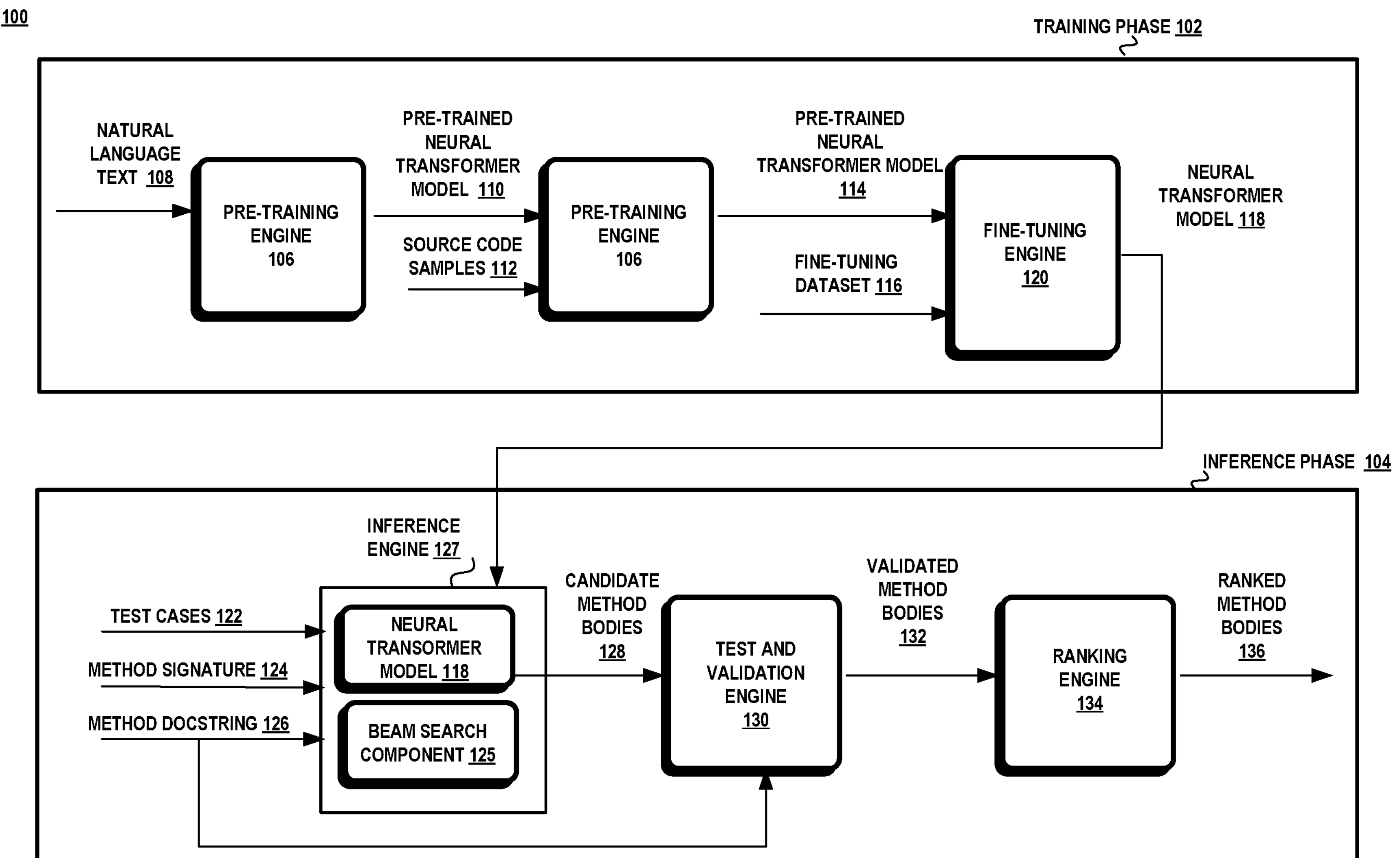
FIG. 1 illustrates an exemplary system for training a neural transformer model for test-driven development and deploying the trained neural transformer model in a test-driven development system.

Aspects disclosed herein relate to the automation of the test-driven development process using a deep learning model to predict source code snippets that implement a set of test cases. The predicted source code snippets are then validated for syntactic correctness and tested against the given set of test cases. The source code snippets passing the testing and validation are ranked according to a quality metric score. The top ranked source code snippets are then output in the ranked order.

In an aspect, the techniques described herein are applied to the generation of a method body of a source code program conditioned on test cases for a target functionality using a deep learning model. The model is trained to learn to predict the probability P(m|doc, sig, tc) of a focal method m, given a docstring doc, a signature sig, and a group of test cases tc.

A method is a self-contained module of source code within a larger program that is bundled together to achieve a specific outcome. A method is not the entry point of program execution (i.e., main( )). A docstring or code summarization is a natural language description of the behavior and/or functionality of the method. A method signature includes the method name, input parameters, if any, and output values. A test case is a source code snippet containing instructions and assertions that verify the functionality and behavior of a source code component, such as a method body. A method body is the source code instructions that implement the behavior and functionality of the method and does not include the method signature.

In one aspect, the model is a neural transformer model configured as a sequence-to-sequence model that learns to translate an input sequence of one domain into an output sequence of another domain. The neural transformer model employs an encoder-decoder configuration where the encoder encodes the input sequences of the first domain into an internal representation and the decoder blocks decode the internal representation into a target domain. The neural transformer model is trained on an unsupervised training dataset of natural language text, then on an unsupervised training dataset of source code programs, and fine-tuned on a supervised dataset of tuples, where each tuple consists of a set of test cases, method signature, and docstring. The model learns to predicts a method body given a set of test cases and optionally, its associated method signature and docstring.

In an aspect, the techniques described herein may be implemented as part of a source code editor, an integrated development environment (IDE), and/or a web service. A developer may request a method body to implement a target set of unit test cases while developing the unit test cases in a source code editor or IDE. The method body may be generated by a tool that is part of the source code editor or an extension. Alternatively, the tool may be part of a web service that the developer interacts with through a set of Application Programming Interfaces (API). The web service may be part of the source code editor, IDE or a separate service. However, it should be noted that the system and techniques described herein are not limited to these applications and can be utilized in other software development environments.

Attention now turns to a description of the system for automating the test-driven development using a neural transformer model.

System

FIG. 1 illustrates a block diagram of an exemplary system 100 in which various aspects of the invention may be practiced. As shown in FIG. 1, system 100 includes a training phase 102 that trains the neural transformer model and an inference phase 104 where the model is used to predict one or more method bodies given a method body, docstring, and a group of test cases.

In the training phase 102, a pre-training engine 106 pre-trains the neural transformer model 110 on an unsupervised set of training data including unlabeled English language text 108 and then on a large unsupervised training data of unlabeled source code samples 112 to learn the syntactic structure of natural language and source code and the semantics of a programming language.

In one aspect, the order in which the pre-training engine 106 trains the neural transformer model is performed by first training on the English corpus and then subsequently pre-training on source code. The pre-training on the English corpus first allows the model to learn semantic relationships between words. The subsequent pre-training on source code is intended to specialize the model on source code, aiming at learning syntactical properties of the programming language, while retaining semantic knowledge.

In one aspect, the English text may be obtained from any one or more of the following four corpora: (1) Books Corpus, and English Wikipedia corpus; (2) the English language portion of the CommonCrawl News ("CC-NEWS") dataset which contains 63 million English news articles crawled between September 2016 and February 2019; (3) the OPENWEBTEXT dataset; and (4) STORIES, a dataset containing a subset of the CommonCrawlNews data filtered to match the story-like style of Winograd schemas.

In an aspect, an unsupervised training dataset 112 from source code files from various source code repositories is obtained to train the model to understand source code. A source code repository may contain source code files from different domains, such as without limitation, scientific computing, web development, dataflow programming, machine learning, and the like. The source code files are written in the same programming language. In one aspect, the source code samples are all written in the Java programming language.

The pre-trained neural transformer model 114 is then separately fine-tuned by the fine-tuning engine 120 on the task of method body generation, modeled as a translation task, with a supervised fine-tuning dataset 116 which includes tuples of a method docstring, method signature, and test cases of a focal method. The fine-tuned model 118 learns to predict the corresponding method body.

In the inference phase 104, an inference engine 127 receives a set of test cases 122, a method signature 124, and docstring 126, if any, and invokes a beam search component 125 to use the neural transformer model 118 to predict one or more candidate method bodies 128 for the given inputs. Each of the candidate method bodies 128 is validated for syntactic correctness and then tested using the test cases 122 by a test and validation engine 130. Those candidate method bodies passing the validation and test cases 132 are then ranked by the ranking engine 134. The ranked method bodies 136 are then presented to the developer in the ranked order.

Attention now turns to a discussion of the neural transformer model.

Neural Transformer Model

A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, support vector machines, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with each configuration suited for a particular task. The method body generation task utilizes an encoder-decoder neural transformer model architecture. The model uses a denoising autoencoder that is trained to reconstruct natural language text and source code programs where a random subset of the words in the text and code have been masked out. The model is then forced to learn to reconstruct the original text/code. The decoder is a left-to-right autoregressive decoder that optimizes a reconstruction loss between the decoder's output and the original text.

Figure 2:
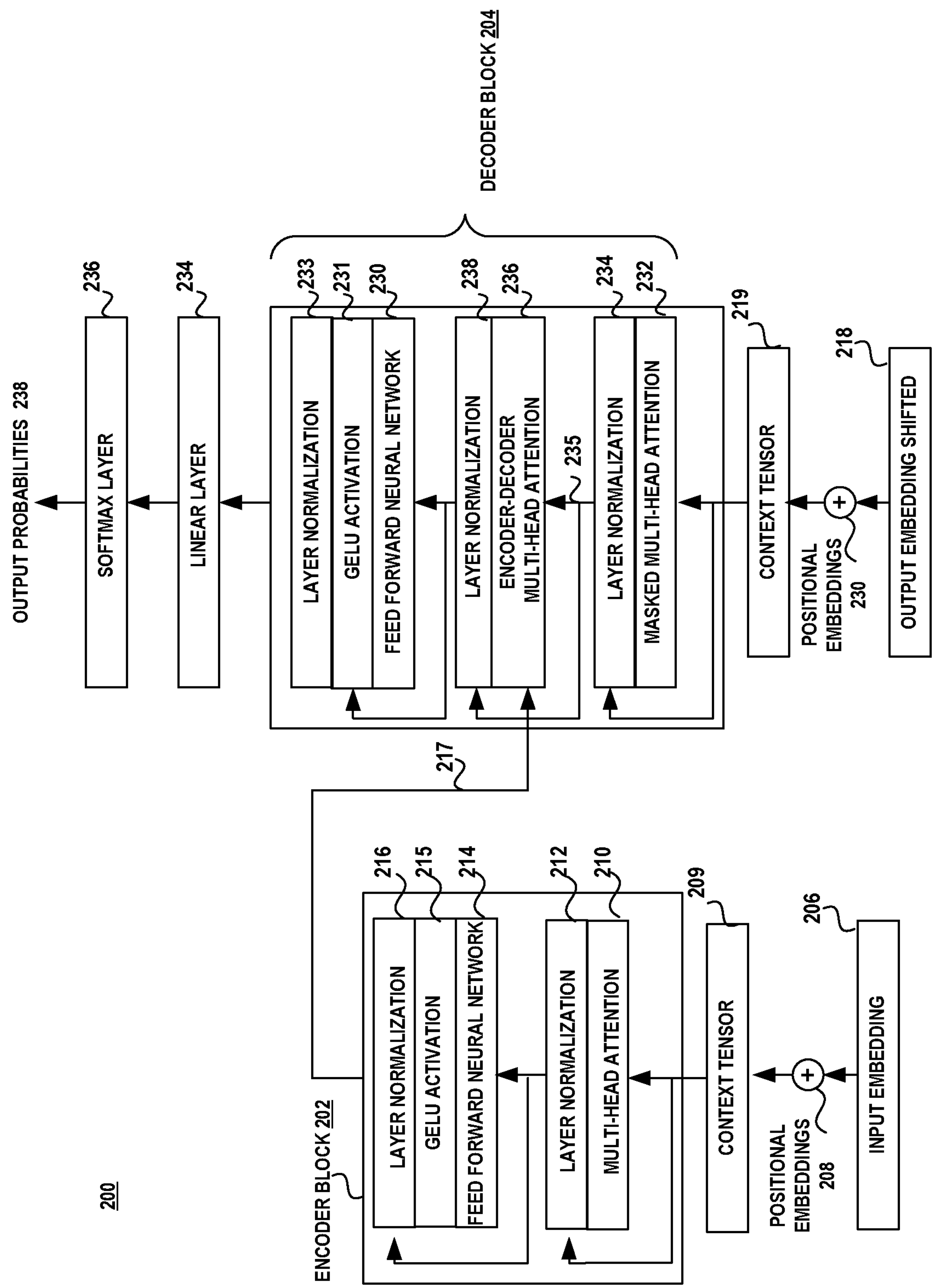
FIG. 2 is a schematic diagram illustrating an exemplary architecture of a neural transformer model based on encoder and decoder blocks with attention.

FIG. 2 shows an exemplary structure of the neural transformer model with attention in an encoder-decoder configuration. The neural transformer model with attention 200 contains one or more encoder blocks 202 and one or more decoder blocks 204. The initial inputs to an encoder block 202 are the input embeddings 206 of an input sequence of a training dataset. In order to retain the order of the tokens in the input sequence, positional embeddings 208 are added to the input embedding 206 forming a context tensor 209. The initial inputs to the decoder block 204 are a shifted sequence of the output embeddings 218 to which the positional embeddings 220 are added forming context tensor 219.

An encoder block 202 consists of two layers. The first layer includes a multi-head attention component 210 followed by layer normalization component 212. The second layer includes a feed-forward neural network 214 followed by a Gaussian Error Linear Unit (GELU) activation layer 215 and then a layer normalization component 216. The context tensor 209 is input into the multi-head attention layer 210 of the encoder block 202 with a residual connection to layer normalization 212. The output of the layer normalization 212 is input to the feed forward neural network 214 with another residual connection to layer normalization 216. The output of the encoder block 202 is a set of hidden representations 217. The set of hidden representations 217 is then sent through additional encoder blocks, if multiple encoder blocks exist, or to the decoder 204.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The multi-head attention component 210 takes a context tensor 209 and weighs the relevance of each subtoken represented in the context tensor to each other by generating attention weights for each subtoken in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots, \text{head}_h)W^O,$$

$$\text{where head}_i=\text{Attention}(QW_i^Q,KW_i^K,VW_i^V),$$

with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W_i^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 212 that precedes the feed forward neural network 214 and a second layer normalization 216 that follows the feed forward neural network 214.

The feed-forward neural network 214 processes each output encoding separately. The output of the top encoder block is a set of attention vectors K and V 217 which is used by the encoder-decoder multi-head attention layer 236 of the decoder block 204.

The GELU is an activation function that scales the output of the feed-forward neural networks for the layer normalization layer. The GELU is defined as follows:

$\text{GELU}(x)=0.5x\ (1+\tanh\ (\sqrt{2}/\pi\ (x+0.044715x^3)))$. The GELU activation function is used to achieve faster and better convergence that a sigmoid function and to avoid the vanishing gradient problem.

The decoder block 204 predicts each subtoken $t_i$ in the target language one-by-one at each time step conditioned on all previously-generated target subtokens $t_1, \ldots t_{i-1}$. The decoder block 204 consists of three layers. The first layer includes a masked multi-head attention component 232 followed by a layer normalization component 234. The output of the layer normalization component 234 is input into the encoder-decoder multi-head attention component 236 with a residual connection 235 to layer normalization component 238. The second layer includes an encoder-decoder multi-head attention component 236 followed by a layer normalization component 238. The output of layer normalization component 238 is input into the feed forward neural network 230 with a residual connection to layer normalization component 233. The third layer includes a feed forward neural network 230 followed by GELU activation 231 and then a layer normalization component 233.

The masked multi-head attention component 232 receives the output embeddings of the previous timestep. The masked multi-head attention component 232 masks the output embeddings from future time steps. The encoder-decoder multi-head attention layer 236 receives queries from the previous decoder layer 325 and the memory keys and values 217 from the output of the encoder block 202. In this manner, the decoder block 204 can attend to every position of the input sequence. The feed-forward neural network 230 processes each output encoding separately. A layer normalization component 234, 238, 233 is used between the layers in order to normalizes the inputs across the features.

The linear layer 234 projects the vector produced by the stack of decoders into a logits vector. The softmax layer 236 then turns the scores of the logits vector into probabilities 238 for each subtoken in the vocabulary which are positive and normalized.

In one aspect, the neural transformer model contains a stack of twelve encoder blocks and a stack of twelve decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Pre-Training the Model

Figure 3:
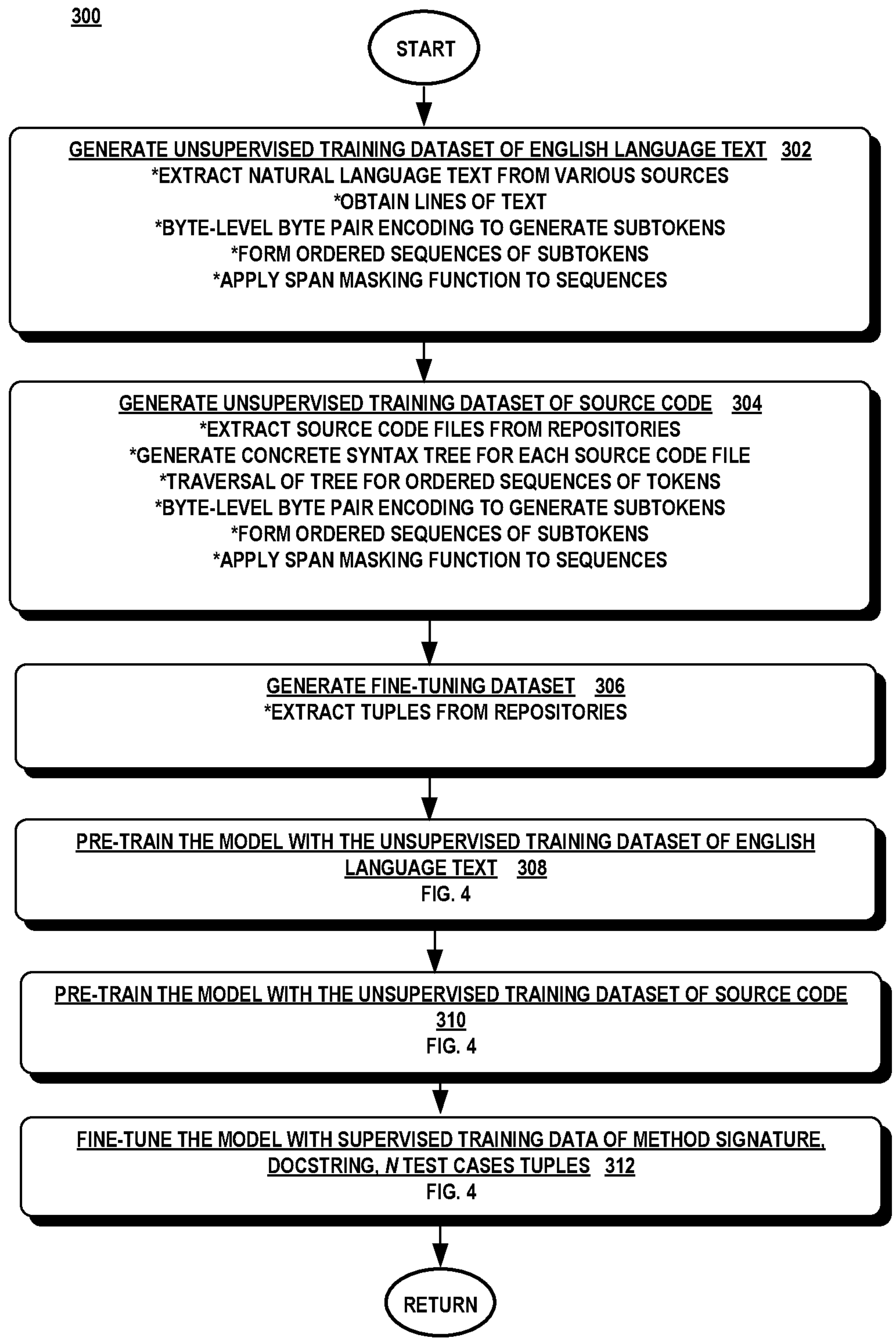
FIG. 3 is a flow diagram illustrating an exemplary method for training the neural transformer model.

FIG. 3 is a flow diagram illustrating an exemplary process 300 for training the neural transformer model with attention. The unsupervised training datasets of sequences of English language and source code and the supervised training datasets of the translation task are generated and then applied to the model. When the model has been trained and verified successfully, the neural transformer model with attention is deployed into a test-driven development system.

A diverse corpus of unlabeled English text, derived from various sources is used to obtain sequences of English-language text. T-ordered sequences of subtokens are generated from each line of English text, where T is the maximum context length. Byte-level byte-pair encoding (BBPE) is used to generate the vocabulary used by the neural transformer model with attention. A text string of natural language text is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 302).

The byte-level subwords are generated using the BBPE which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a natural language text segment. The T-ordered sequence of subtokens is represented into a context vector. (Collectively, block 302).

A denoising function, such as a span masking function, is then applied to each sequence that randomly masks out a subset of subtokens and the masked span of subtokens is replaced with a mask subtoken, M The model is trained with the masked sequences to learn to reconstruct the original sequence without the masked subtokens. In one aspect, the mask subtoken replaces a span of subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 302).

A pre-training dataset of source code methods from a corpus of unlabeled source code programs or files in the same programming language is obtained. The pre-training engine transforms each of the selected source code files into a concrete syntax tree. The concrete syntax tree represents the source code text in a parsed form. The concrete syntax tree may also be a parse tree. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the tokens. A token is a symbol that represents an operand or an operator. The concrete syntax tree differs from an abstract syntax tree where the terminal nodes represent operands. (Collectively, block 304).

The pre-training engine uses a tokenizer to extract tokens from the concrete syntax tree. The frequently-used elements in a programming language are encoded into tokens and the less frequently-occurring elements are encoded into combinations of characters referred to as subtokens. For simplicity, the term subtoken shall include tokens and subtokens. (Collectively, block 304).

The pre-training engine uses a byte-level byte-pair extraction component to generate T-ordered sequences of subtokens as noted above. A denoising function, such as a span masking function, is then applied to each sequence that randomly masks out a subset of subtokens and the masked span of subtokens is replaced with a mask subtoken, M, as noted above. (Collectively, block 304).

The fine-tuning engine generates training datasets from a source code repository where the training dataset includes input sequences, where each input sequence includes a set of test cases for a focal method, and optionally, the method signature of the focal method and a docstring, if any. (Collectively, block 306).

The model is then pre-trained with the English language text (block 308), followed by pre-training the model with the source code training dataset (block 310), and then fine-tuned with the fine-tuning dataset (block 312).

Applying Input Sequences of Training Datasets to the Model

Figure 4:
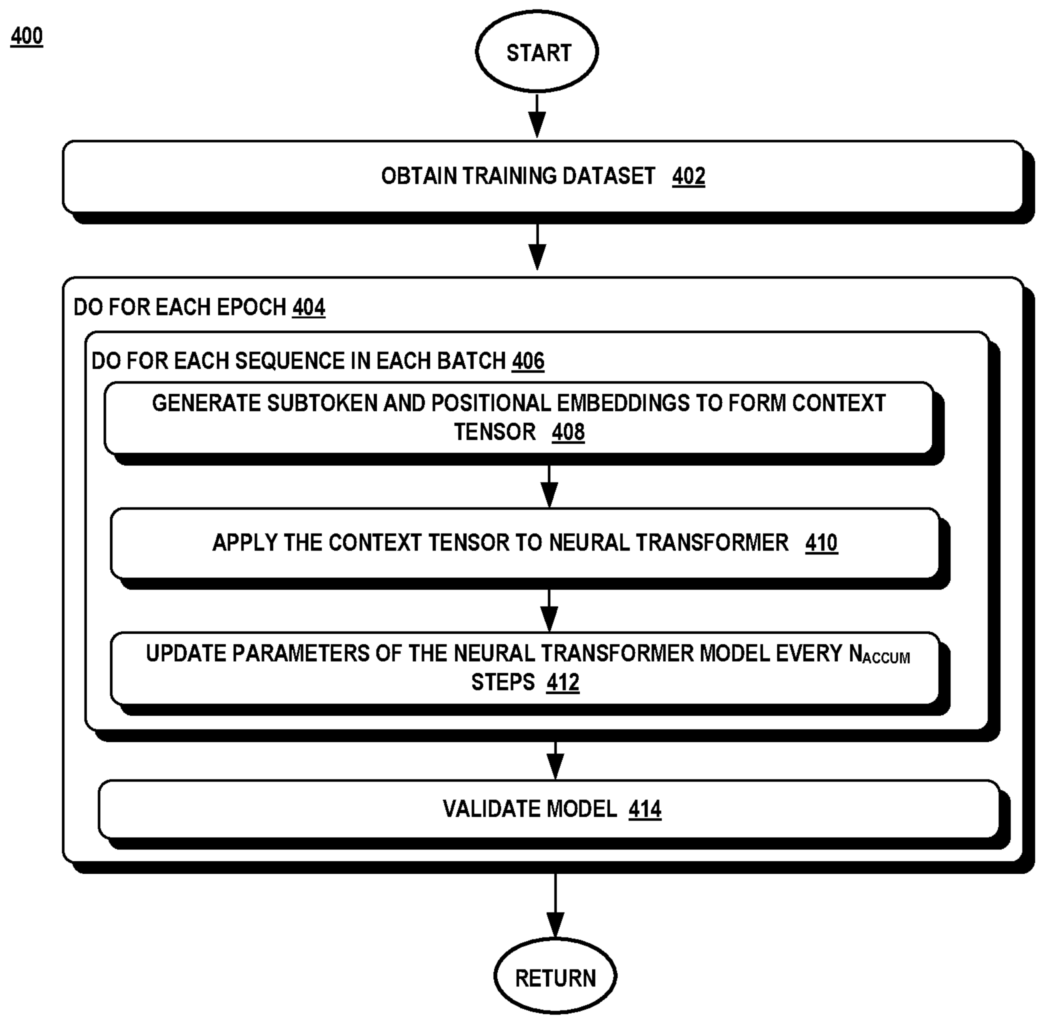
FIG. 4 is a flow diagram illustrating an exemplary method for applying the training dataset to the neural transformer model.

Turning to FIG. 4, there is shown the process of training the model 400 by applying each sequence of a training dataset. The pre-training engine pre-trains the neural transformer model with attention with the unsupervised training datasets and the fine-tuning engine applies the supervised fine-tuning dataset to the neural transformer model. Each training dataset is applied to the neural transformer model independently. For example, the masked sequences of English text are feed through the pre-training pipeline first (blocks 404-414). When that phase of the training is completed, the process repeats with the masked sequences of source code (blocks 404-414), and then the fine-tuning training datasets are applied to the model (blocks 404-414).

At each training application, a respective training dataset is obtained (block 402).

Neural transformer models are trained iteratively, making multiple passes over a training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 404).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 404).

In one aspect, the hyperparameters may include the following: (1) subtoken and position embedding layers of dimensions: 30000×768, and 1024×768 respectively; (2) the configuration of the neural transformer model with twelve encoder blocks and twelve decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and an inverse square root learning rate schedule with the base learning rate of 0.0001; a warmup period of 5000 update steps; local gradient accumulation with a frequency of four update steps; (4) the data normalization procedure: normalize all string and numerical literals, keeping the ten most frequent; and (5) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, dedent, and indent symbols. (Collectively, block 404).

For each sequence of each batch in each epoch (blocks 406), the T-ordered sequences of subtokens are then mapped into numeric vectors and then into respective subtoken embeddings and positional embeddings (block 408). An embedding is a learned representation for the text-based subtokens where subtokens that have a common meaning have a common representation. An embedding is a mapping of discrete categorical variables to a vector of continuous numbers. There is an embedding for each subtoken in the vocabulary and a corresponding positional embedding. The subtoken embedding matrix represents the learned representation for the subtokens of the vocabulary. The neural transformer model does not read each subtoken sequentially and as such, has no knowledge of the subtoken's position in a sequence without additional position information. The positional embedding matrix is used to embed position information about a subtoken's position in a sequence into the neural transformer model.

Initial values are generated for the subtoken embedding and positional embeddings of each sequence which are then used to form a context tensor. Thereafter, the neural transformer model learns the values for each embedding. Upon the completion of the pre-training phase, the embeddings for each subtoken and the positional embeddings are saved into respective matrices for later use. There is a subtoken embedding matrix, We, that contains an embedding vector for each subtoken $t_i$, i=0 . . . V, and a positional embedding matrix, Wp, that contains an embedding vector $P_j$, j=0 . . . T, for each position, where V is the size of the vocabulary and Tis the length of the subtoken sequence. (Collectively, block 410).

The first encoder block of the neural transformer model takes the context tensor as input and passes it through the multiple layers of multi-head attention, layer normalization, feed-forward neural network, GELU activation, and layer normalization to finally produce a set of hidden representations If there are additional encoder blocks, the output of each encoder block is passed onto the next encoder block with the output of the last encoder block producing the set of hidden representations. The set of hidden representations is passed onto each decoder block. (Collectively, block 410).

The decoder blocks of the neural transformer models take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 410).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 410).

At the completion of each batch, the parameters of the neural transformer model are updated at a preconfigured frequency denoted as Naccum. Naccum is a gradient accumulation frequency and in one aspect has a value of 4. The parameters include the subtoken embeddings and the positional embeddings which are stored in a respective embedding matrix. (Collectively, block 412).

Next, the neural transformer model with attention is validated. Before the neural transformer model with attention is trained, a set of hyperparameters is selected randomly and then tuned to achieve a desired performance. The neural transformer model with attention is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 414).

Attention now turns to discussion of the use of the neural transformer model in an inference system.

Inference Phase

The inference phase of the method body generation relies on a beam search to generate one or more candidate method bodies to associate with a given set of test cases, method signature and docstring. The decoder's computation at training time can be parallelized using masked self-attention but during inference, the subtokens are generated one token at a time. The neural transformer model factorizes the probability of the target subtokens $t_i$ in an input sequence into a product of conditional probabilities for each subtoken using the formula: $p(t_1, \ldots t_m|s)=\Pi_{i=1}^{m}p(t_1, \ldots, t_{i-1}, s)$. During inference, the calculation of arg $\max_t p(t|s)$ is complex and extremely time consuming making the model useless for real-time applications. Beam search is an approximation algorithm that performs faster.

The beam search uses the probability distribution generated by the neural transformer model to identify the top k subtokens likely to be the next subtoken in a candidate sequence. The beam search expands the search by instantiating new partial sequences using each of the selected subtokens identified by the neural transformer model's probability distribution. The search continues generating new partial sequences from the top k subtokens identified by the output distributions from the neural transformer model until the search ends. The search may end when the end-of-method subtoken appears as the most probable next subtoken.

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current context sequence with the selected subtoken to input into the neural transformer model to generate an additional probability distribution for the next subtoken in a sequence. This process is repeated until the end of a method token is predicted as being the next likely subtoken candidate.

Figure 5:
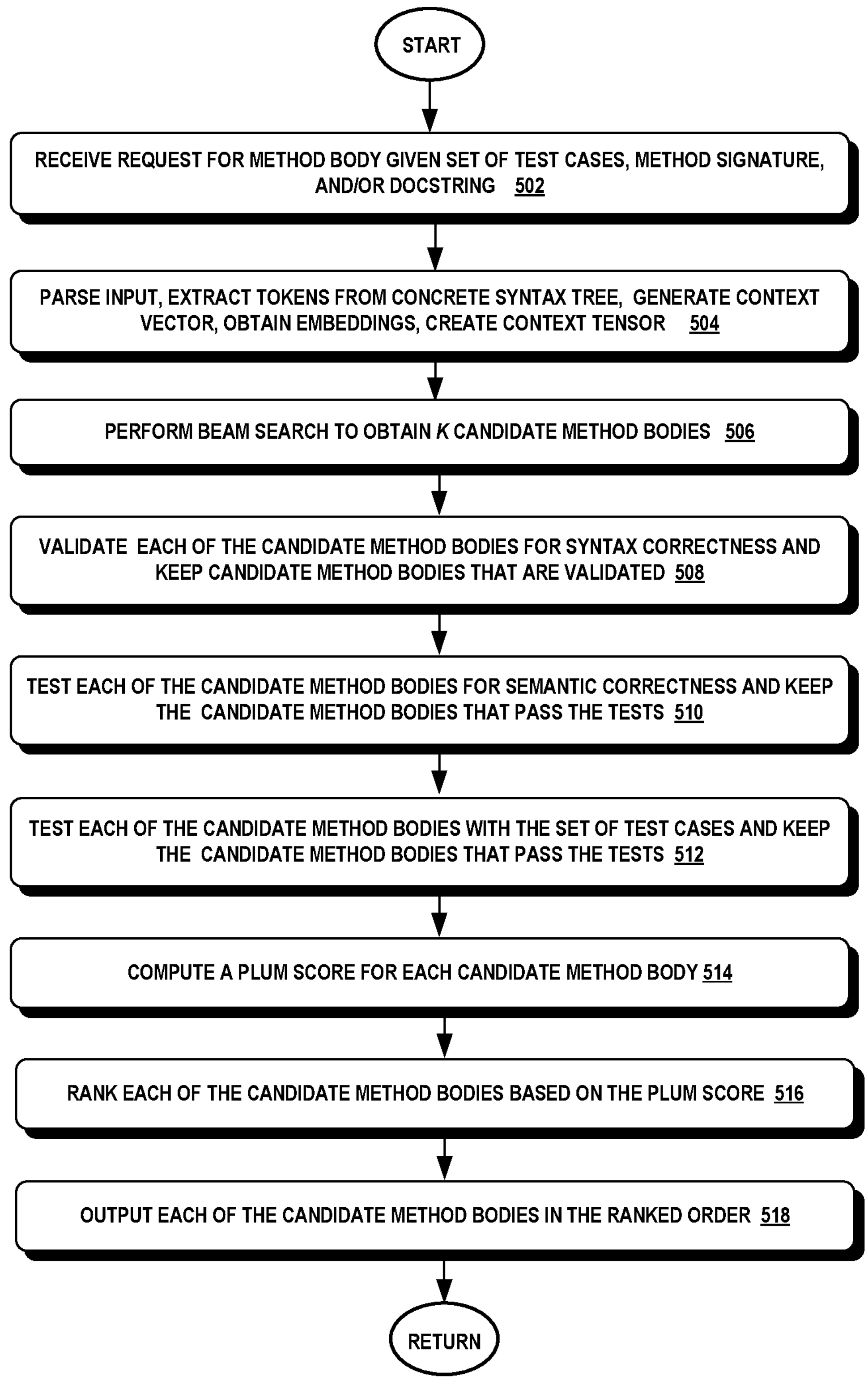
FIG. 5 is a flow diagram illustrating an exemplary method for deploying the neural transformer model in a test-driven development system.

Turning to FIG. 5, the inference engine receives a request for candidate method bodies given a set of test cases, a method signature, and a docstring of a focal method (block 502).

These inputs are parsed into a concrete syntax tree and tokenized to extract tokens and/or subtokens in an ordered sequence. The ordered sequence of T subtokens is then vectorized into a context vector using the subtoken and positional embedding matrices of the trained model and creating a context tensor. (Collectively, block 504).

A beam search uses the context tensor to initiate an inference process using the probability distribution generated from the neural transformer model, $P_0 \ldots P_{|V|}$. If the probability distribution indicates that an end-of-method token is the most likely subtoken to follow in a partial candidate method body, then the top k candidate method bodies are output. Otherwise, the beam search takes the top k states or subtokens identified from the probability distribution generated by the neural transformer model in the inference process. A new context vector is generated for each of the k states, $c_1, \ldots c_k$, using the new subtoken in the context vector. The new context vectors are then input into the inference process. The beam search ends when the end-of-method token is selected as the most likely candidate to complete a partial candidate method body. (Collectively, block 506).

Each of the k candidate method bodies are then validated for syntax correctness. In one aspect, a parser is used to validate the syntax correctness of each of the k candidate method bodies. Those candidate method bodies that fail the syntax validation are eliminated. (Collectively, block 508).

The remaining candidate method bodies are then tested for semantic correctness by injecting each candidate method body into a donor class within the target system, one candidate method at a time, and the class is compiled along with the entire system. Specifically, the compiler (e.g., javac for Java language) attempts to compile the class containing a candidate method body. The output of the compiler is examined, and if the compilation is successful, that is the candidate method body is semantically correct with regards to the target system, the candidate is kept, while the candidates which do not compile are eliminated. (Collectively, block 510).

The remaining candidate method bodies are then tested using the set of test cases provided. Those candidate method bodies that fail a test case are eliminated. Only method candidates which pass all the test cases provided by the user are kept. (Collectively, block 512).

The remaining candidate method bodies are then ranked based on one or more quality metrics. In one aspect, a Programming Language Understanding Metric (PLUM) score is used to rank the candidate method bodies. PLUM is a general score that aggregates several code quality metrics into a single score used to evaluate a candidate method body, where the highest score indicates a better-quality candidate method body. Specifically, a PLUM score for the candidate method body m is generally defined as $\mathrm{PLUM}(m)=\Sigma_{k=0}^{n} w_k\, \mathrm{metric}_k(m)$, where $\mathrm{metric}_k$ is a code quality metric from a set of n metrics, and $w_k$ is the weight associated with the metric that defines the importance of such metric for the user preference. In an aspect, the set of code quality metrics include one or more of the following: code complexity (e.g., cyclomatic complexity), code size, maintainability index, code coupling and cohesion, code readability (variable and function names), code understandability (presence of comments), and performance measures. (Collectively, block 514).

Cyclomatic complexity is a testing metric used for measuring the complexity of a software program or a component of a program, such as a method. It is a quantitative measure of independent paths in the source code of a software program. It can better-quality be calculated by using control flow graphs. A program that has complex control flow requires more tests to achieve good code coverage and is less maintainable. Thus, a program or method with a low cyclomatic complexity score is considered better since it is easier to understand and less risky to modify. An exemplary cyclomatic complexity score is the McCabe complexity score. The McCabe complexity score is inverted to assign a higher score to less complex programs or methods.

The code size metric measures the actual lines of source code in a program or method body, excluding comments. Methods with a smaller number of lines of source code are preferred to methods having a larger number of lines of source code. The code size metric is inverted so a higher score is assigned to those methods having a smaller number of lines of source code.

A maintainability index calculates an index value that represents the relative ease of maintaining the code. The index values range from 0 to 100 where a high value indicates better maintainability.

Coupling refers to the degree two classes are dependent on each other. A significant change in one low coupled class would not affect have a significant effect on the other. Highly-coupled classes are indicative of closely-related classes where a change in one class would make it difficult to change the other class.

Cohesion refers to degree to which the source code elements belong to each other. High cohesion is indicative of the source code being understandable, reliable, and reusable while a low cohesion is indicative of the source code being difficult to maintain, hard to reuse or understand. Code readability refers to the degree to which the source code text is easy to understand. For a measure of code readability in an aspect, the identifiers (e.g., variables and function names) within a method body are analyzed with respect to commonly-used words found in a natural language dictionary. A measure of code understandability, in an aspect, is based on a number of comments per lines of code in a program or method body. Methods with a higher number of comments is given a higher score than methods with less comments.

In an aspect, a performance metric may include the execution time (in milliseconds) of a method body. A method is given a higher performance metric based on a lower execution time than a method having a higher execution time.

A PLUM score is computed for each candidate method body. The PLUM score can include one or more quality and/or performance metrics. A developer may specify the particular metrics to incorporate into the PLUM score and may assign a weight to each metric. (Collectively, block 514).

The candidate method bodies that pass all the tests are ranked in the order of their PLUM score from highest value to lowest value (block 516). The candidate method bodies are then output based on their ranking (block 518). The candidate method bodies may be output into a source code program, source code editor, or returned as a web response (block 518).

Figure 6:
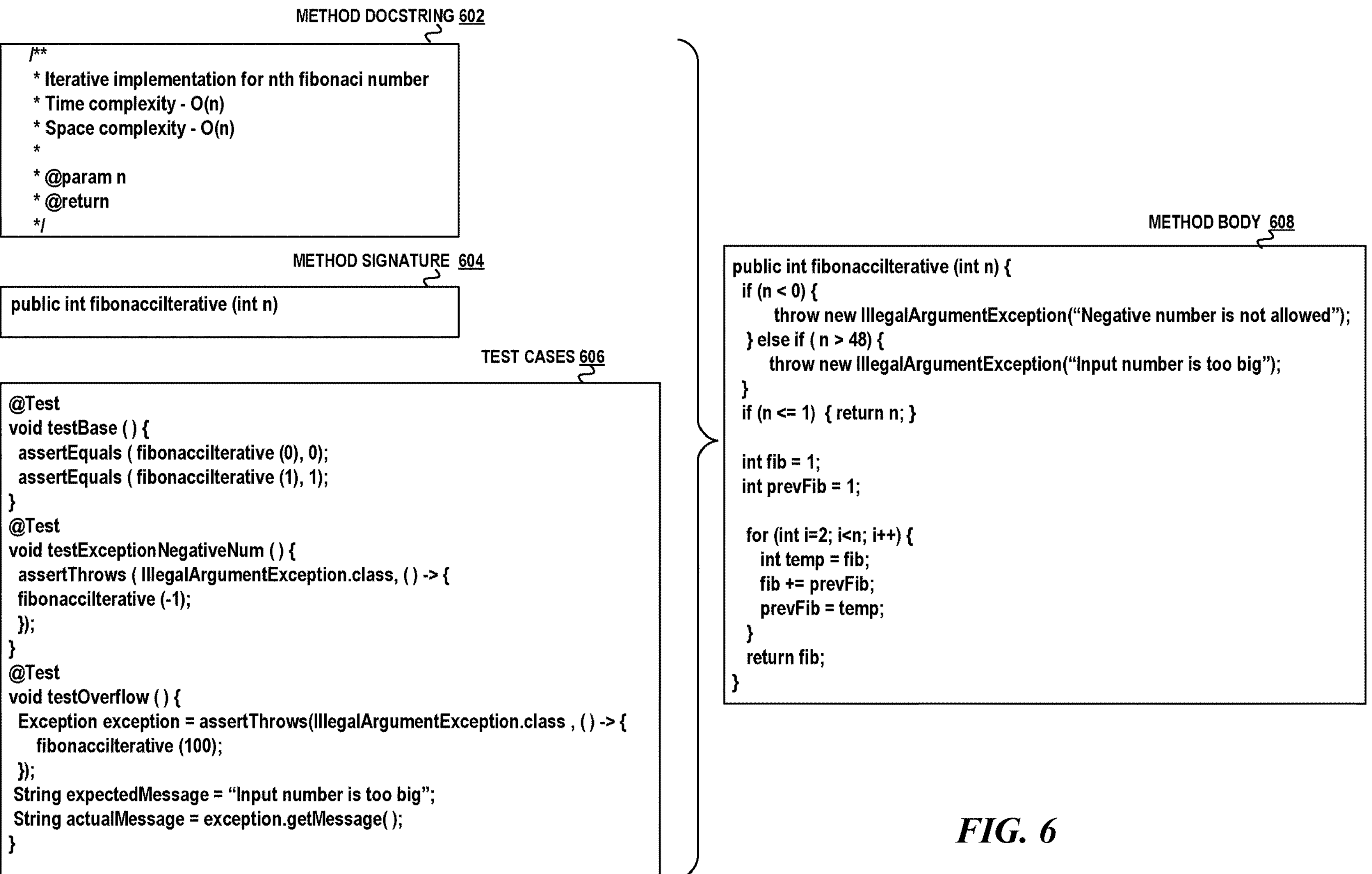
FIG. 6 is a schematic diagram illustrating an exemplary method body predicted from the neural transformer model given a method signature, docstring, and a set of test cases.

Attention now turns to an exemplary illustration of the test-driven development process. Turning to FIG. 6, there is shown a docstring 602 for a focal method named fibonacciIterative written in the Java programming language. The focal method has a method signature 604 and a set of test cases 606. The inference engine accepts these inputs 602, 604, 606 and generates k candidate method bodies using the neural transformer model with attention. After the syntax correctness and validation are performed, only one candidate method body remains which is method body 608.

Exemplary Operating Environment

Figure 7:
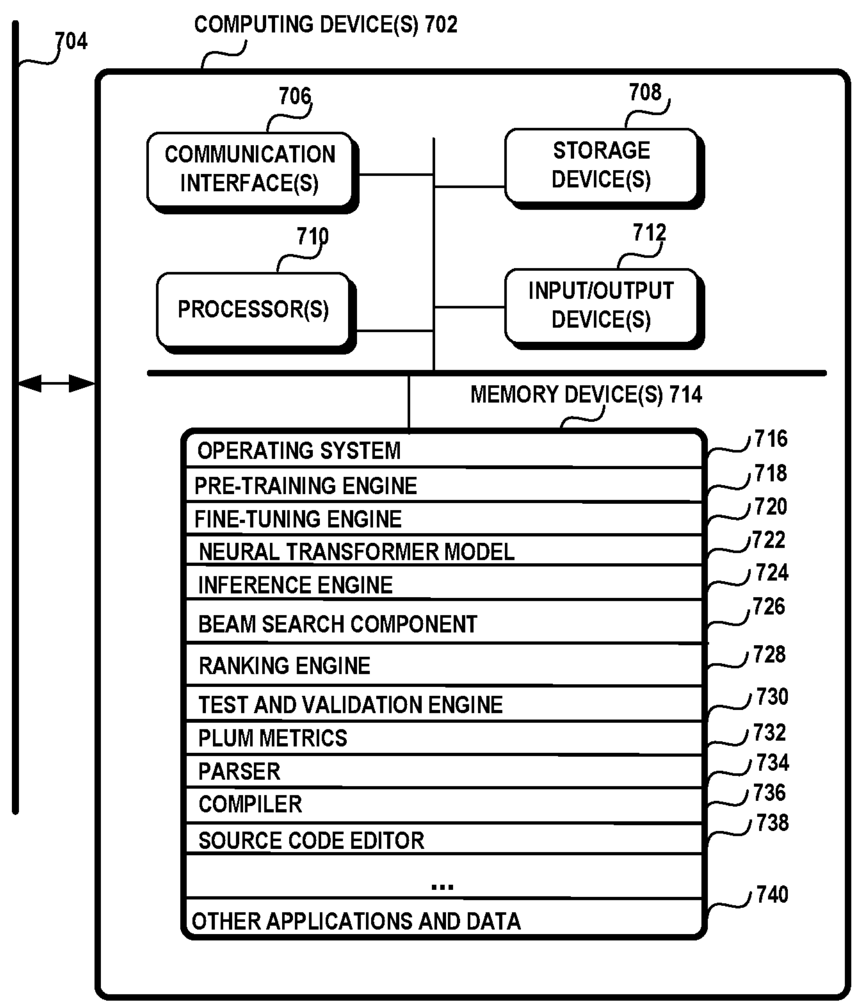
FIG. 7 is a block diagram illustrating an operating environment.

Attention now turns to a discussion of an exemplary operating environment. FIG. 7 illustrates an exemplary operating environment 700 in which one or more computing devices 702 are used in a test-driven development system. In one aspect, the training of the neural transformer model and the usage of the model in the inference engine may be performed on a single device. However, it should be noted that the aspects disclosed herein are not constrained to any particular configuration of devices.

In alternate embodiments, the test-driven development system may be configured as a cloud service that trains and operates the neural transformer model as a service. A client device may transmit to the cloud service the inputs for the model (e.g., test cases, method signature, docstring) to generate/predict candidate method bodies which are returned to the client device. The interaction between the client device and the cloud service may be performed through various APIs.

Alternatively, the cloud service may fine-tune an existing pre-trained model with the client's fine-tuning data to create a version of the model fine-tuned for the client's task. Yet in another embodiment, the client device may include a source code editor or IDE using the test-driven development system as an add-on, extension, or plug-in module that interacts with the cloud service to generate the candidate method bodies as the developer is generating the unit test cases in the editor or IDE. Other variations are possible and it should be noted that the operating environment is not limited to any particular configuration.

The computing devices 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1300 may be configured in a network environment, a distributed environment, a multi-processor environment, or a stand-alone computing device having access to remote or local storage devices.

The computing devices 702 may include one or more processors 710, one or more communication interfaces 706, one or more storage devices 708, one or more input/output devices 712, and one or more memory devices 714. A processor 710 may be any commercially available or customized processor and may include dual microprocessors and multi-processor architectures. A communication interface 706 facilitates wired or wireless communications between the computing device 702 and other devices. A storage device 708 may be computer-readable medium that does not contain propagating signals, such as modulated data signals transmitted through a carrier wave. Examples of a storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 708 in the computing devices 702. The input/output devices 712 may include a keyboard, mouse, pen, voice input device, touch input device, display, speakers, printers, etc., and any combination thereof.

A memory device 714 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 714 may also include one or more external storage devices or remotely located storage devices that do not pertain to propagated signals, such as modulated data signals transmitted through a carrier wave.

The memory device 714 may contain instructions, components, and data. A component is a software program that performs a specific function and is otherwise known as a module, program, component, and/or application. The memory device 714 may include an operating system 716, a pre-training engine 718, a fine-tuning engine 720, a neural transformer model 722, an inference engine 724, a beam search component 726, a ranking engine 728, a test and validation engine 730, PLUM metrics 732, parser 734, compiler 736, source code editor 738, and other applications and data 740.

The computing devices 702 may be communicatively coupled via a network 704. The network 704 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 704 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A system is disclosed comprising: one or more processors; and a memory that stores one or more programs that are configured to be executed by the one or more processors. The one or more programs include instructions to perform actions that: obtain a plurality of test cases for testing a focal method, wherein source code of a method body of the focal method has not been developed; generate, from a deep learning model given the plurality of test cases, at least one candidate method body; test the at least one candidate method body for syntactic correctness; upon successful validation of the at least one candidate method body for syntactic correctness, test the at least one candidate method body with the plurality of test cases; and upon the at least one candidate method body successfully passing the plurality of test cases, output the at least one candidate method body.

In an aspect, the one or more programs include further instructions to perform actions that: upon the at least one candidate method body failing the syntactic correctness validation, eliminating the at least one candidate method body. In an aspect, the one or more programs include further instructions to perform actions that: upon the at least one candidate method body failing the plurality of test cases, eliminating the at least one candidate method body. In an aspect, the one or more programs include further instructions to perform actions that: prior to outputting the at least one candidate method body, compiling the at least one candidate method body with a donor class; and upon the at least one candidate method body failing to compile, eliminate the at least one candidate method body.

In an aspect, the one or more programs include further instructions to perform actions that: compute one or more code quality metrics for the at least one candidate method body; and rank the at least one candidate method body based on the one or more code quality metrics. In an aspect, the one or more programs include instructions to perform actions that: obtain a method signature associated with the plurality of test cases; and the deep learning model uses the method signature and the plurality of test cases to generate the at least one candidate method body.

In an aspect, the one or more programs include further instructions to perform actions that: obtain a docstring associated with the plurality of test cases; and the deep learning model uses the docstring, method signature and the plurality of test cases to generate the at least one candidate method body. In an aspect, the deep learning model is a neural transformer model with attention having at least one encoder block coupled to at least one decoder block. In an aspect, the neural transformer model with attention is pre-trained on natural language text and source code and fine-tuned on a plurality of test cases for a plurality of target methods.

A computer-implemented method is disclosed, comprising: accessing a plurality of test cases for a method in a software development environment, wherein source code for a method body of the method has not been implemented; utilizing a deep learning model to generate a plurality of candidate method bodies for the method given the plurality of test cases; validating each of the plurality of method bodies for syntactic correctness and compliance with the plurality of test cases; and upon successful validation and compliance of select ones of the plurality of candidate method body, outputting the select ones of the plurality of candidate method bodies in the software development environment.

In an aspect, the computer-implemented method further comprises: compiling each of the plurality of candidate method bodies using a donor class; and eliminating select ones of the plurality of candidate method bodies that fail to compile. In an aspect, the computer-implemented method further comprises: scoring each of the plurality of candidate method bodies against one or more quality code metrics; and ranking each of the plurality of candidate method bodies based on a respective score.

In an aspect, the one or more quality metrics include cyclomatic complexity metric, code size metric, maintainability index metric, and/or code coupling and cohesion metric. In an aspect, the deep learning model is given a method signature associated with the method and/or a docstring associated with the method. In an aspect, the deep learning model is a neural transformer model with attention.

A computer-implemented method is disclosed, comprising: pre-training a deep learning model on an unsupervised training dataset of natural language text; pre-training the deep learning model on an unsupervised training dataset of source code snippets; tuning the deep learning model on a supervised training dataset, wherein the supervised training dataset includes a plurality of tuples, wherein each tuple includes a method signature of a focal method and a plurality of test cases for the focal method; and applying the deep learning model to generate a plurality of candidate method bodies for a target method given a plurality of test cases for the target method.

In an aspect, the computer-implemented method further comprises providing the deep learning model with a method signature of the focal method and a docstring of the focal method. In an aspect, the computer-implemented method, further comprises: testing each of the plurality of candidate method bodies for syntactic correctness and compliance with the plurality of test cases; and eliminating select ones of the plurality of candidate method bodies that fail the syntactic correctness test and fail to comply with the plurality of test cases. In an aspect, the computer-implemented method further comprises: compiling each of the plurality of candidate method bodies with a donor class; and eliminating select ones of the plurality of candidate method bodies that fail to compile. In an aspect, the deep learning model is a neural transformer with attention in an encoder-decoder configuration.

What is claimed:

1. A system comprising:

one or more processors; and a memory that stores one or more programs that are configured to be executed by the one or more processors, the one or more programs include instructions to perform actions that:

obtain a plurality of test cases for testing a focal method, wherein source code of a method body of the focal method has not been developed;

generate, from a deep learning model given the plurality of test cases, a method signature and/or docstring of the focal method, at least one candidate method body;

test the at least one candidate method body for syntactic correctness;

upon successful validation of the at least one candidate method body for syntactic correctness, test the at least one candidate method body with the plurality of test cases;

upon the at least one candidate method body successfully passing the plurality of test cases, compute one or more code quality metrics for the at least one candidate method body and rank the at least one candidate method body based on the one or more code quality metrics; and output the ranked at least one candidate method body.

2. The system of claim 1, wherein the one or more programs include further instructions to perform actions that:

upon the at least one candidate method body failing the syntactic correctness validation, eliminate the at least one candidate method body.

3. The system of claim 1, wherein the one or more programs include further instructions to perform actions that:

upon the at least one candidate method body failing the plurality of test cases, eliminate the at least one candidate method body.

4. The system of claim 1, wherein the one or more programs include further instructions to perform actions that:

prior to outputting the at least one candidate method body, compile the at least one candidate method body with a donor class; and upon the at least one candidate method body failing to compile, eliminate the at least one candidate method body.

5. The system of claim 1, wherein the deep learning model is a neural transformer model with attention having at least one encoder block coupled to at least one decoder block.

6. The system of claim 5, wherein the neural transformer model with attention is pre-trained on natural language text and source code and fine-tuned on a plurality of test cases for a plurality of target methods.

7. A computer-implemented method, comprising:

accessing a plurality of test cases for a method in a software development environment, wherein source code for a method body of the method has not been implemented;

utilizing a deep learning model to generate a plurality of candidate method bodies for the method given the plurality of test cases, a method signature and/or docstring;

validating each of the plurality of candidate method bodies for syntactic correctness and compliance with the plurality of test cases;

upon successful validation and compliance of select ones of the plurality of candidate method bodies, computing one or more code quality metrics for each of the select ones of the plurality of candidate method bodies and rank the select ones of the plurality of candidate method bodies based on the one or more code quality metrics; and outputting the select ones of the plurality of candidate method bodies in the software development environment.

8. The computer-implemented method of claim 7, wherein validating each of the plurality of candidate method bodies, further comprises:

compiling each of the plurality of candidate method bodies using a donor class; and eliminating select ones of the plurality of candidate method bodies that fail to compile.

9. The computer-implemented method of claim 7, wherein the one or more quality metrics include cyclomatic complexity metric, code size metric, maintainability index metric, and/or code coupling and cohesion metric.

10. The computer-implemented method of claim 7, wherein the deep learning model is a neural transformer model with attention.

* * * * *